United States Patent
Matsumoto et al.

(10) Patent No.: US 10,720,818 B2
(45) Date of Patent: Jul. 21, 2020

(54) SYNCHRONOUS RELUCTANCE TYPE ROTARY ELECTRIC MACHINE

(71) Applicants: Toshiba Industrial Products and Systems Corporation, Kawasaki-shi (JP); Toshiba Infrastructure Systems & Solutions Corporation, Kawasaki-shi (JP)

(72) Inventors: Masaaki Matsumoto, Mie (JP); Takashi Araki, Mie (JP); Makoto Matsushita, Fuchu (JP); Katsutoku Takeuchi, Kokubunji (JP); Toshio Hasebe, Hachioji (JP)

(73) Assignees: Toshiba Industrial Products and Systems Corporation, Kawasaki-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/381,536

(22) Filed: Apr. 11, 2019

(65) Prior Publication Data

US 2019/0238035 A1    Aug. 1, 2019

Related U.S. Application Data

(63) Continuation of application No. PCT/JP2017/037904, filed on Oct. 19, 2017.

(30) Foreign Application Priority Data

Oct. 21, 2016  (JP) .................................. 2016-207311

(51) Int. Cl.
*G06F 9/54* (2006.01)
*H02K 17/26* (2006.01)
(Continued)

(52) U.S. Cl.
CPC ............. *H02K 17/26* (2013.01); *H02K 17/16* (2013.01); *H02K 19/10* (2013.01)

(58) Field of Classification Search
CPC ......... H02K 17/16; H02K 17/26; H02K 19/10
See application file for complete search history.

(56) References Cited

U.S. PATENT DOCUMENTS

2009/0267441 A1*  10/2009  Hiramatsu .............. H02K 3/28
                                                     310/208
2011/0074240 A1   3/2011   Hiramatsu et al.
2017/0256997 A1*  9/2017   Nakayama ............. H02K 1/18

FOREIGN PATENT DOCUMENTS

JP         62-91540      6/1987
JP         9-331659      12/1997
(Continued)

OTHER PUBLICATIONS

International Search Report dated Jan. 23, 2018 in PCT/JP2017/037904 filed Oct. 19, 2017 (with English Translation).

*Primary Examiner* — Muhammad S Islam
(74) *Attorney, Agent, or Firm* — Oblon, McClelland, Maier & Neustadt, L.L.P.

(57) ABSTRACT

A synchronous reluctance type rotary electric machine of an embodiment includes a shaft, a rotor core, rotor core pressers, a plurality of conductor bars, and short-circuit rings. The shaft rotates around a rotation axis. The rotor core is fixed to the shaft and includes multi-layered hollow parts having a convex shape toward a radially inward side formed for each pole in cross section. The rotor core pressers hold the rotor core by pressing the rotor core from both sides in a rotation axis direction. The plurality of conductor bars are disposed in the hollow parts to extend along the rotation axis and have both ends protruding through the rotor core pressers. The short-circuit rings are provided at both ends of each of the plurality of conductor bars and connect the plurality of (Continued)

conductor bars together. Thus, the conductor bars are fixed to the rotor core pressers.

8 Claims, 13 Drawing Sheets

(51) Int. Cl.
*H02K 17/16* (2006.01)
*H02K 19/10* (2006.01)

(56) References Cited

FOREIGN PATENT DOCUMENTS

| | | |
|---|---|---|
| JP | 11-146615 | 5/1999 |
| JP | 2000-197325 | 7/2000 |
| JP | 2000-341891 | 12/2000 |
| JP | 2003-9484 | 1/2003 |
| JP | 2011-78242 | 4/2011 |

\* cited by examiner

SYNCHRONOUS RELUCTANCE TYPE ROTARY ELECTRIC MACHINE

CROSS-REFERENCE TO RELATED APPLICATIONS

This application is a continuation of International Application No. PCT/JP2017/037904, filed Oct. 19, 2017, which is based upon and claims the benefit of priority from Japanese Patent Application No. 2016-207311, filed on Oct. 21, 2016; the entire contents of which are incorporated herein by reference.

FIELD

Embodiments described herein relate generally to a synchronous reluctance type rotary electric machine.

BACKGROUND

A synchronous reluctance type rotary electric machine includes a rotor and a stator. The rotor includes a shaft rotatably supported and extending in an axial direction with a rotation axis as a center, and a rotor core externally fitted and fixed to the shaft. The stator includes a stator core disposed around an outer circumference of the rotor core and spaced apart from the rotor core and having a plurality of teeth disposed at intervals in a circumferential direction and includes multipole multiphase armature windings respectively wound around the plurality of teeth.

Multi-layered hollow parts having a convex shape toward a radially inward side are formed for each pole in the rotor core. When the hollow parts are formed in this manner, a direction in which magnetic flux easily flows and a direction in which magnetic flux does not easily flow are formed in the rotor core. Thus, the synchronous reluctance type rotary electric machine rotates the shaft using a reluctance torque generated by the hollow parts.

Incidentally, at the time of starting a synchronous reluctance type rotary electric machine, it is necessary to detect a relative position between the stator core and the rotor core and to supply electric power to predetermined armature windings on the basis of the relative position. Therefore, an inverter is required to start the synchronous reluctance type rotary electric machine, which may increase the costs of the synchronous reluctance type rotary electric machine.

Thus, in order for the synchronous reluctance type rotary electric machine to be able to start without using an inverter, a so-called self-starting type synchronous reluctance type rotary electric machine in which a nonmagnetic conductor is provided in each of the hollow parts to generate an induced torque has been proposed.

Here, in order to reduce leakage magnetic flux at an outer circumferential portion of the rotor core, the hollow parts are formed as close as possible to the outer circumferential surface of the rotor core. Also, in order to fix the conductor to the hollow parts, a melted conductor is cast into the hollow parts in some cases. When the conductor is cast into a hollow part, the whole of the hollow part is filled with the conductor. In such a case, since magnetic flux pulsating according to a pitch of teeth of the stator links with the conductor, a harmonic current that does not contribute to rotation of the rotor flows through the conductor. Since the harmonic current is converted into Joule heat, there is a likelihood of the efficiency of the synchronous reluctance type rotary electric machine decreasing according to that amount.

DETAILED DESCRIPTION

A synchronous reluctance type rotary electric machine of an embodiment includes a shaft, a rotor core, rotor core pressers, a plurality of conductor bars, and short-circuit rings. The shaft rotates around a rotation axis. The rotor core is fixed to the shaft and includes multi-layered hollow parts having a convex shape toward a radially inward side formed for each pole in cross section. The rotor core pressers hold the rotor core by pressing the rotor core from both sides in a rotation axis direction. The plurality of conductor bars are disposed in the hollow parts to extend along the rotation axis and have both ends protruding through the rotor core pressers. The short-circuit rings are provided at both ends of each of the plurality of conductor bars and connect the plurality of conductor bars together. Thus, the conductor bars are fixed to the rotor core pressers.

Hereinafter, a synchronous reluctance type rotary electric machine of an embodiment will be described with reference to the drawings.

First Embodiment

Figure 1:
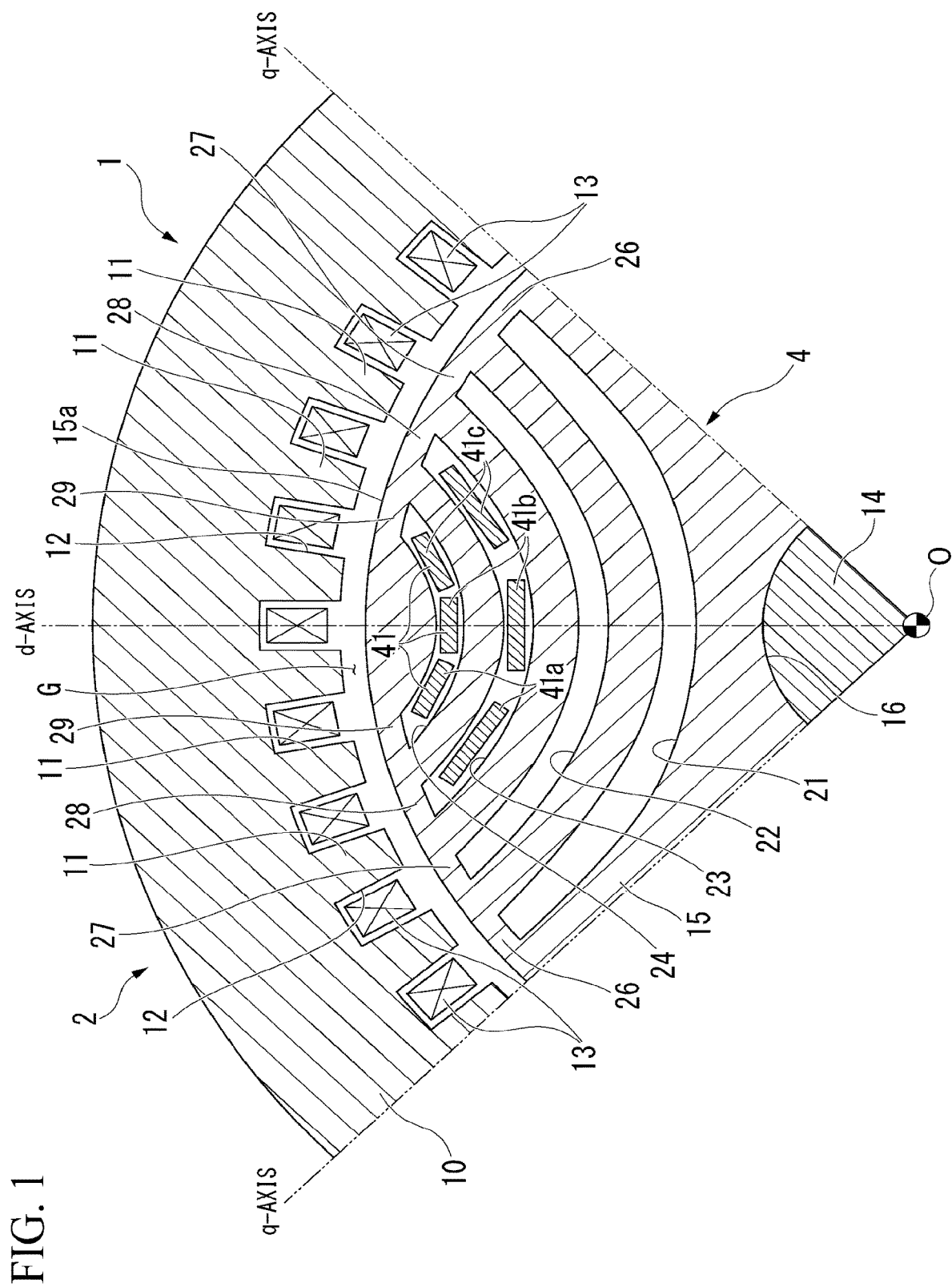
FIG. 1 is a cross-sectional view showing a configuration of a portion of a synchronous reluctance type rotary electric machine of a first embodiment.

FIG. 1 is a cross-sectional view perpendicular to a shaft 14 (central axis O) showing a configuration of a portion of a rotary electric machine 1. In FIG. 1, a quarter sector of the rotary electric machine 1, that is, only a quarter-circumference circumferential angular region is shown.

As shown in FIG. 1, the rotary electric machine 1 includes a substantially cylindrical stator 3, and a rotor 4 provided on a radially inward side of the stator 3 and provided to be rotatable with respect to the stator 3. Further, the stator 3 and the rotor 4 are disposed in a state in which central axes thereof are positioned on a common axis. Hereinafter, the common axis will be referred to as a central axis (rotation axis) O, a direction perpendicular to the central axis will be referred to as a radial direction, and a direction of revolving around the central axis O will be referred to as a circumferential direction.

The stator 3 includes a substantially cylindrical stator core 10. The stator core 10 can be formed by laminating a plurality of electromagnetic steel sheets or by compression-molding a soft magnetic powder. On an inner circumferential surface of the stator core 10, a plurality of teeth 11 protruding toward the central axis O and disposed at regular intervals in the circumferential direction are integrally molded. The teeth 11 are formed to have a substantially rectangular cross section. A plurality of slots 12 and the plurality of teeth 11 are formed at regular intervals in the circumferential direction so that one slot 12 is disposed between adjacent teeth 11. Through these slots 12, armature windings 13 are wound around each of the teeth 11.

Figure 2:
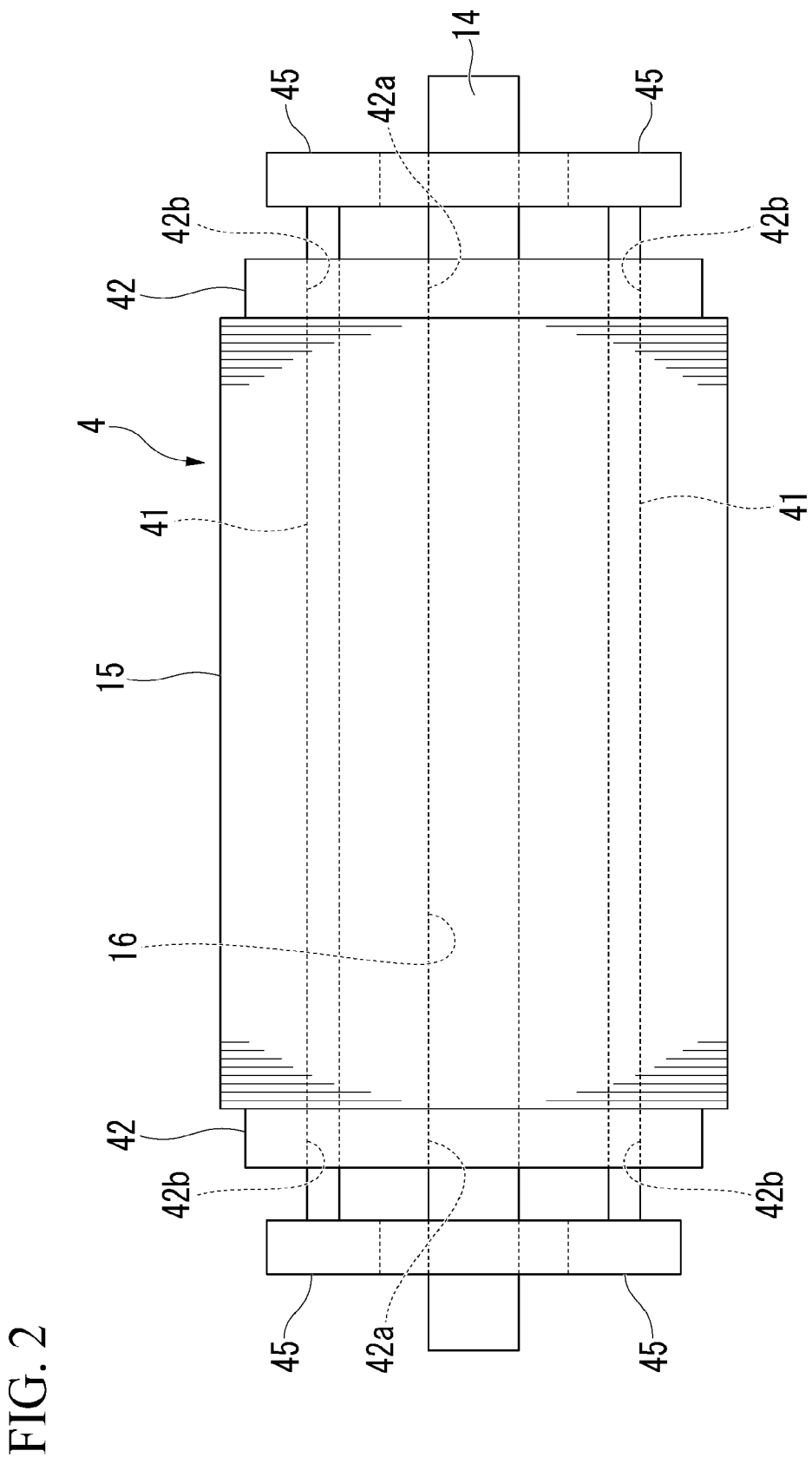
FIG. 2 is a side view showing a rotor of the first embodiment.

FIG. 2 is a side view showing the rotor 4 from the radial direction of the shaft 14.

As shown in FIGS. 1 and 2, the rotor 4 is disposed on a radially inward side of the stator core 10. The rotor 4 includes the shaft 14 extending along the central axis O and a substantially columnar rotor core 15 externally fitted and fixed to the shaft 14.

The rotor core 15 can be formed by laminating a plurality of electromagnetic steel sheets or by compression-molding a soft magnetic powder. An outer diameter of the rotor core 15 is set such that a predetermined air gap G is formed between each of the teeth 11 and the rotor core 15 facing each other in the radial direction. Also, a through hole 16 penetrating in the central axis O direction is formed at a radial center of the rotor core 15. The shaft 14 is press-fitted or the like to the through hole 16, and thereby the shaft 14 and the rotor core 15 rotate integrally.

Further, four layers of hollow parts (flux barriers) 21, 22, 23, and 24 (a first hollow part 21, a second hollow part 22, a third hollow part 23, and a fourth hollow part 24) are formed to be aligned in the radial direction in each of the quarter-circumference circumferential angular regions of the rotor core 15. That is, the first hollow part 21 is formed at a position closest to the shaft 14 (on a furthest inward side in the radial direction of the rotor core 15), and the second hollow part 22, the third hollow part 23, and the fourth hollow part 24 are aligned in this order from the first hollow part 21 in a direction away from the shaft 14 (toward a radially outward side). Thus, the fourth hollow part 24 is disposed at a position farthest from the shaft 14 (at a furthest outward side in the radial direction).

Also, each of the hollow parts 21 to 24 is formed to follow a flow of magnetic flux formed when the armature windings 13 are energized. That is, each of the hollow parts 21 to 24 is formed to be curved so that a center thereof in the circumferential direction is positioned furthest inward in the radial direction (to have a convex shape toward a radially inward side). Thereby, a direction in which the magnetic flux easily flows and a direction in which the magnetic flux does not easily flow are formed in the rotor core 15. In the following description, a longitudinal direction of each of the hollow parts 21, 22, 23, and 24 when viewed from the central axis O direction (substantially lateral direction in FIG. 1) will be simply referred to as a longitudinal direction of the hollow parts 21, 22, 23, and 24 in some cases.

Here, in the present embodiment, a direction in which the magnetic flux easily flows is referred to as a q-axis. Also, a direction in the radial direction that is electrically and magnetically perpendicular to the q-axis is referred to as a d-axis. That is, each of the hollow parts 21 to 24 forms a multilayer structure in the radial direction along the d-axis.

More specifically, regarding a q-axis direction in the rotor core 15, a direction in which a flow of the magnetic flux is not interrupted by each of the hollow parts 21 to 24 is referred to as the q-axis. That is, a positive magnetic potential (for example, an N pole of a magnet being brought close thereto) is given to an arbitrary circumferential angular position on an outer circumferential surface 15a of the rotor core 15. Also, a negative magnetic potential (for example, an S pole of a magnet being brought close thereto) is given to another arbitrary circumferential angular position shifted by one pole (a mechanical angle of 90 degrees in the present embodiment) with respect to the positive magnetic potential. Then, when positions of such positive magnetic potential and negative magnetic potential are shifted in the circumferential direction, a direction from the central axis O toward an arbitrary position when a majority of the magnetic flux flows is defined as the q-axis. Thus, the longitudinal direction of each of the hollow parts 21 to 24 is the q-axis.

On the other hand, a direction in which a flow of the magnetic flux is interrupted by each of the hollow parts 21 to 24, that is, a direction magnetically perpendicular to the q-axis is referred to as the d-axis. In the present embodiment, a direction parallel to a direction in which two rotor core portions, separated into a region close to the central axis O and a region which is distant from the central axis O by each of the hollow parts 21 to 24, face each other is the d-axis. Also, when the hollow parts 21 to 24 are formed in multiple layers (four layers in the present embodiment) as in the present embodiment, a direction in which the layers overlap is the d-axis. In the present embodiment, the d-axis is not limited to being electrically and magnetically perpendicular to the q-axis and may intersect the q-axis with a certain degree of angular width (for example, a mechanical angle of about 10 degrees) from the perpendicular angle.

As described above, the rotor core 15 is configured to have four poles, and four layers of the hollow parts 21 to 24 are formed for each pole (a quarter-circumference circumferential angular region of the rotor core 15). Thus, one pole is a region between the q-axes. That is, each of the hollow parts 21 to 24 is formed to be curved toward the radially inward side so that each of the hollow parts 21 to 24 on the d-axis is positioned furthest inward in the radial direction.

Also, each of the hollow parts 21 to 24 is formed to be curved so that both ends thereof in a longitudinal direction are positioned on an outer circumferential portion of the rotor core 15 when viewed from the central axis O direction. Then, each of the hollow parts 21 to 24 is formed to follow the q-axis as a position thereon becomes closer to both ends in the longitudinal direction and to be perpendicular to the d-axis as a position thereon becomes closer to a center in the longitudinal direction.

Further, bridges 26, 27, 28, and 29 (a first bridge 26, a second bridge 27, a third bridge 28, and a fourth bridge 29) are respectively formed between both ends in the longitudinal direction of each of the hollow parts 21 to 24 and the outer circumferential surface 15a of the rotor core 15 in the q-axis direction.

Here, three conductor bars 41 (41a, 41b, and 41c) are inserted into each of the third hollow part 23 and the fourth hollow part 24 among the hollow parts 21 to 24. The three conductor bars 41 are disposed at regular intervals in the longitudinal direction in the hollow parts 23 and 24. More specifically, one (conductor bar 41b) of the three conductor bars 41 is disposed on the d-axis of each of the hollow parts 23 and 24. Also, the conductor bars 41 (conductor bars 41a and 41c) are respectively disposed on both sides in the longitudinal direction of each of the hollow parts 23 and 24. The conductor bars 41a and 41c respectively disposed on both sides in the longitudinal direction of the hollow part 23 are disposed to be spaced apart at a predetermined distance from bridges 28 positioned on both sides of the hollow part 23. The conductor bars 41a and 41c respectively disposed on both sides in the longitudinal direction of the hollow part 24 are disposed to be spaced apart at a predetermined distance from the bridges 29 positioned on both sides of the hollow part 24.

Each of the conductor bars 41 has substantially a rectangular cross-sectional shape perpendicular to the central axis O direction and is an elongated plate-shaped member. Also, the conductor bar 41 is formed of a nonmagnetic material having conductivity such as, for example, an aluminum alloy or a copper alloy. Further, both ends in the central axis O direction of the conductor bar 41 are formed to respectively protrude from both ends in the central axis O direction of the rotor core 15. These both ends of the conductor bar 41 are short-circuited by short-circuit rings 45.

The short-circuit rings 45 are annular members disposed to be spaced apart from the rotor core 15 on both sides in the central axis O direction. Radial centers of the short-circuit rings 45 also coincide with the central axis O. As in the conductor bars 41, the short-circuit rings 45 are formed of a nonmagnetic material having conductivity. Specifically, the short-circuit rings 45 is preferably formed of the same material as that of the conductor bars 41 such as, for example, an aluminum alloy or a copper alloy. However, it is not limited thereto.

On an inner surface on the rotor core 15 side of the short-circuit rings 45, recesses 46 into which the conductor bars 41 can be inserted are formed at positions corresponding to each of the conductor bars 41. The conductor bars 41 are respectively press-fitted or inserted into these recesses 46, and the short-circuit rings 45 and the conductor bars 41 are connected and fixed to each other by fusion or the like.

Further, a method of fixing the short-circuit rings 45 and the conductor bars 41 is not limited to the above-described method. For example, by forming the short-circuit rings 45 as a molded structure, the short-circuit rings 45 and the conductor bars 41 may be fixed at the time of molding the short-circuit ring 45.

Also, core pressers 42 (rotor core pressers) are respectively provided at both ends of the rotor core 15 in the central axis O direction. The core pressers 42 are formed in substantially a disc shape with a nonmagnetic material (for example, a hard resin or the like) and restrict movement of the rotor core 15 with respect to the shaft 14 in the central axis O direction or cause the rotor core 15 formed by laminating a plurality of electromagnetic steel sheets to be integrated.

A through hole 42a that allows the shaft 14 to be press-fitted is formed at a radial center of each of the core pressers 42. Thereby, the core pressers 42 are fixed to the shaft 14, and movement of the rotor core 15 with respect to the shaft 14 in the central axis O direction is restricted.

A conductor insertion hole 42b is formed in each of the core pressers 42 at a position corresponding to the conductor bar 41. The conductor bar 41 is press-fitted into the conductor insertion hole 42b. Thereby, the conductor bar 41 is fixed to the core presser 42. Thus, the conductor bar 41 protrudes toward both sides in the central axis O direction from the core pressers 42 (on the short-circuit ring 45 side) through the conductor insertion holes 42b.

When the rotary electric machine 1 is driven with such a configuration, a three-phase alternating current is supplied to the armature windings 13 of the stator 3. Then, a magnetic flux is formed in predetermined teeth 11. Then, the teeth 11 in which the magnetic flux is formed are sequentially switched in a rotation direction (circumferential direction) of the rotor 4 (the formed magnetic flux moves rotationally).

At this time, in an asynchronous state until the rotor 4 in a stopped state rotates in synchronization with rotational movement of the magnetic flux on the stator 3 side, an induced current is generated in the conductor bars 41 provided in the rotor core 15. That is, each of the conductor bars 41 functions as a secondary coil and generates a starting torque for rotating the rotor 4 between the conductor bars 41 and the stator 3.

Here, regarding the conductor bars 41 (conductor bars 41a and 41c) disposed on both sides in a longitudinal direction of each of the hollow parts 23 and 24, each of the conductor bars 41a and 41c disposed in the hollow part 23 is disposed to be spaced apart from the bridge 28 at a predetermined distance, and each of the conductor bars 41a and 41c disposed in the hollow part 24 is disposed to be spaced apart from the bridge 29 at a predetermined distance. Therefore, harmonic magnetic flux due to torque ripple generated in the air gap G between the stator 3 and the rotor 4 does not readily link with each of the conductor bars 41a and 41c and harmonic secondary copper loss does not readily occur.

Therefore, according to the first embodiment described above, since an inverter is not necessary for starting the rotary electric machine 1, the commodity costs of the rotary electric machine 1 can be reduced.

Also, in the first embodiment described above, the conductor bars 41 are fixed to the core pressers 42 provided at both ends of the rotor core 15 in the central axis O direction. Therefore, the conductor bars 41 can be reliably fixed only to a portion of the hollow parts 21 to 24 without casting nonmagnetic conductors having conductivity into each of the hollow parts 21 to 24 of the rotor core 15.

As a result, since the size of the conductor bars 41 can be reduced to a minimum, manufacturing costs of the rotary electric machine 1 can also be reduced. Also, since a starting torque for efficiently rotating the rotor 4 can be obtained while reducing the size of the conductor bars 41 to a minimum, the driving efficiency of the rotary electric machine 1 can be improved.

Further, since the conductor bars 41 are fixed to the core pressers 42, the conductor bars 41 (the conductor bars 41a and 41c) respectively disposed on both sides in the longitudinal direction of the hollow part 23 can be disposed to be spaced apart at a predetermined distance from the bridge 28, and the conductor bars 41 (the conductor bars 41a and 41c) respectively disposed on both sides in the longitudinal direction of the hollow part 24 can be disposed to be spaced apart from the bridge 29 at a predetermined distance. Therefore, a high starting torque can be obtained while suppressing linkage of the harmonic magnetic flux which does not contribute to the rotation of the rotor 4 with the conductor bars 41 as much as possible. Therefore, the driving efficiency of the rotary electric machine 1 can be reliably improved.

Modified Example of First Embodiment

In the first embodiment described above, a case in which, when the conductor bars 41 are fixed to the core pressers 42, the conductor bars 41 are press-fitted into the conductor insertion holes 42*b* formed in the core pressers 42 has been described. However, it is not limited thereto, and various configurations can be employed as long as the conductor bars 41 can be fixed to the core pressers 42.

For example, instead of press-fitting, the conductor bars 41 may be fixed to the conductor insertion holes 42*b* of the core pressers 42 by shrinkage-fitting. In addition, for example, a configuration like the following modified examples can be employed.

First Modified Example of First Embodiment

Figure 3:
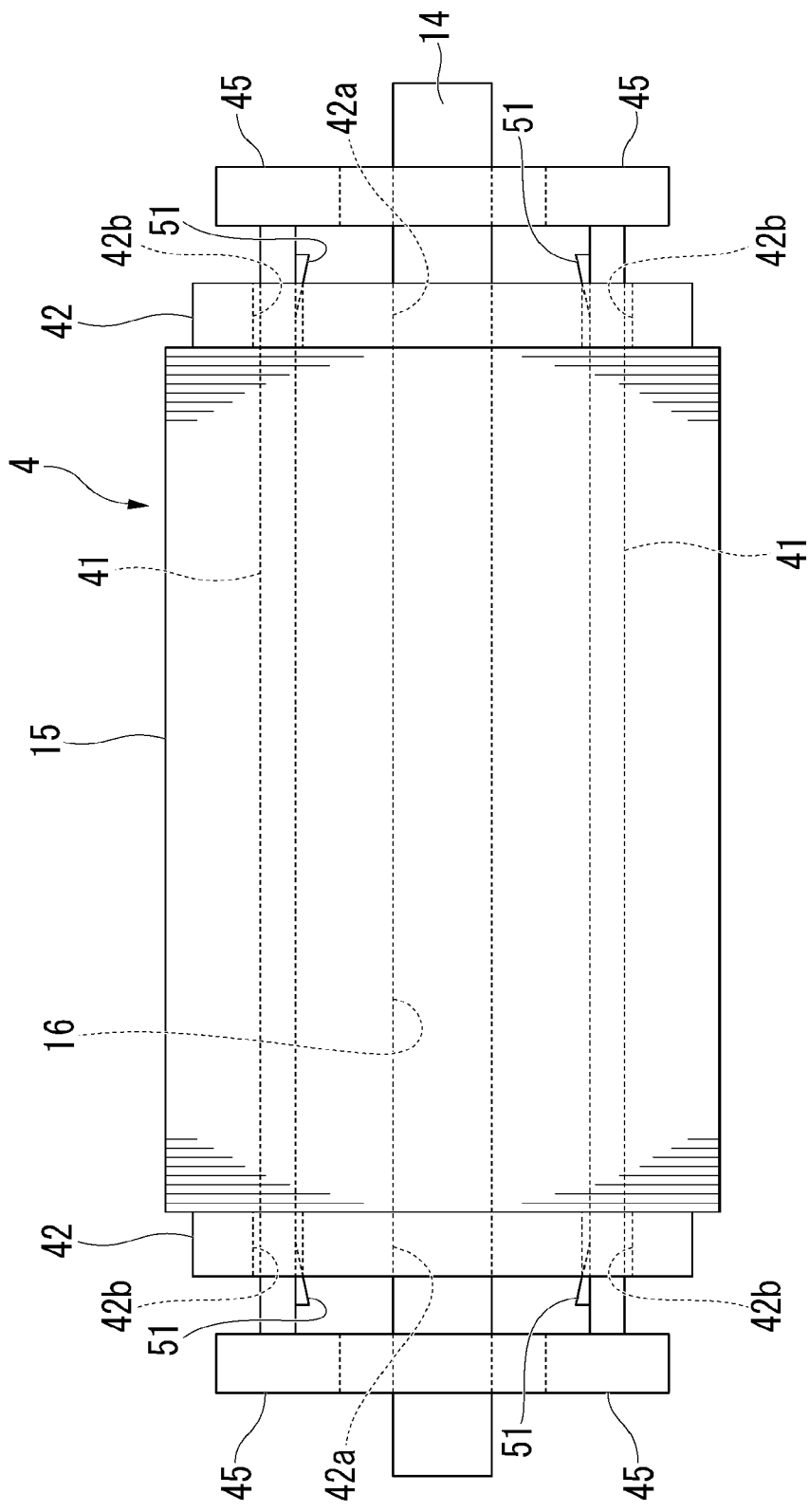
FIG. 3 is a side view showing a rotor of a first modified example in the first embodiment.

FIG. 3 is a side view showing the rotor 4 of a first modified example in the first embodiment and corresponds to FIG. 2 described above. Aspects the same as in the above-described first embodiment are assigned the same reference signs and description thereof will be omitted (this is the same in subsequent modified examples and embodiments).

As shown in FIG. 3, an opening area of each of the conductor insertion holes 42*b* of the core presser 42 is set to be slightly larger than a cross-sectional area of each of the conductor bars 41 perpendicular to the central axis O (hereinafter simply referred to as a cross-sectional area) at a portion corresponding to the conductor insertion hole 42*b* of the conductor bar 41. Then, a fixing peg 51 is driven into a gap formed between the conductor insertion hole 42*b* and the conductor bar 41. The fixing peg 51 is formed in a so-called wedge shape. Due to the fixing peg 51 driven therein, the core pressers 42 and the conductor bar 41 are fixed.

Therefore, according to the first modified example, the core presser 42 and the conductor bar 41 can be reliably fixed to each other without setting machining dimensions of the conductor insertion hole 42*b* and the conductor bar 41 with high accuracy. Therefore, machining costs of the core presser 42 and the conductor bar 41 can be reduced.

Second Modified Example of First Embodiment

Figure 4:
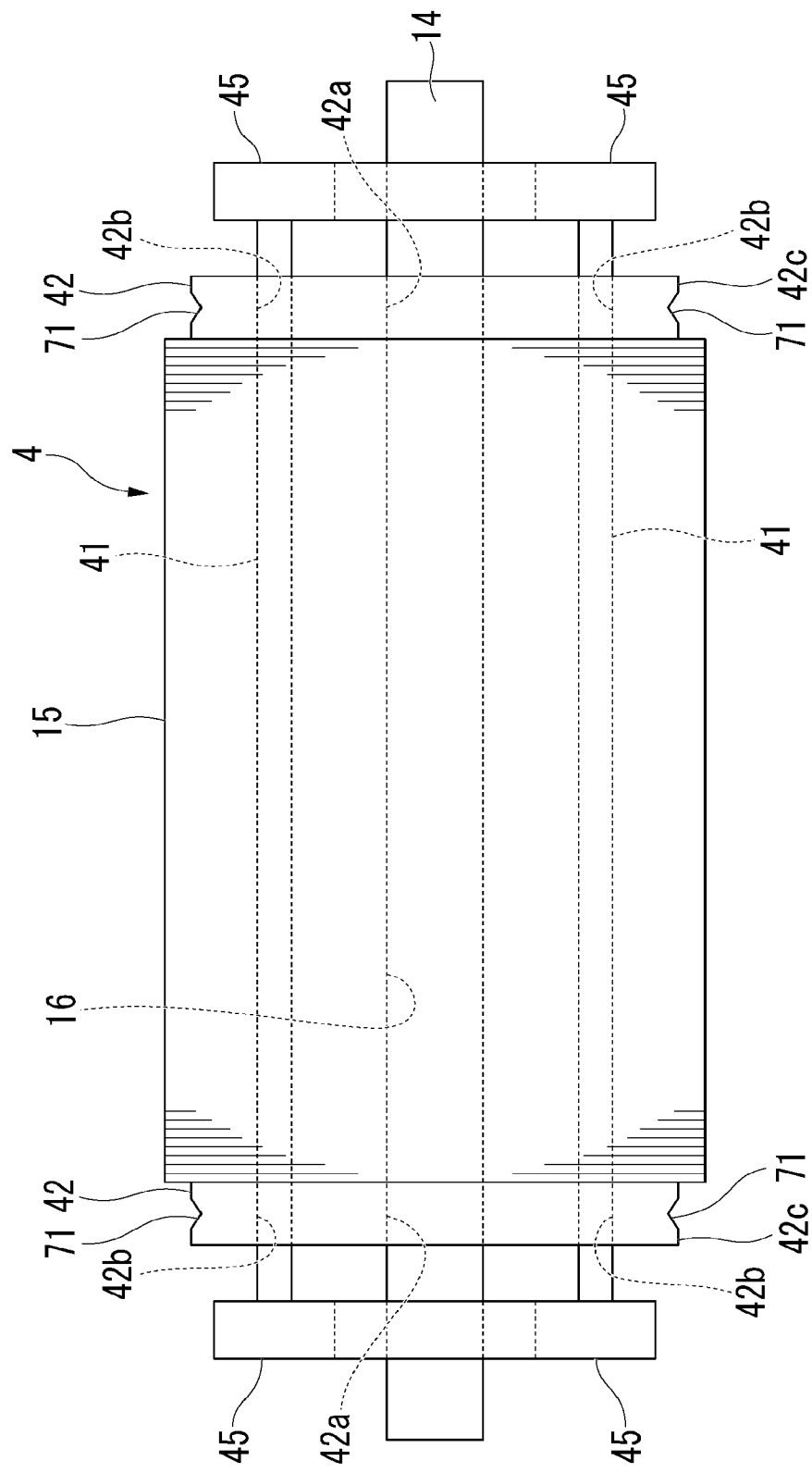
FIG. 4 is a side view showing a rotor of a second modified example in the first embodiment.

FIG. 4 is a side view showing the rotor 4 of a second modified example in the first embodiment and corresponds to FIG. 2 described above.

As shown in FIG. 4, a plurality of crimped parts (outer circumferential crimped parts, crimped marks) 71 are formed in a circumferential direction on an outer circumferential surface 42*c* of the core presser 42 in the vicinity of the conductor insertion hole 42*b*. The crimped parts 71 are formed by crimping the outer circumferential surface 42*c* of the core presser 42. When the crimped parts 71 are formed on the outer circumferential surface 42*c* of the core presser 42, a radially outward side of the conductor insertion hole 42*b* has a slightly crushed shape. Thereby, the conductor bar 41 is crimped and fixed to the core presser 42.

Therefore, according to the second modified example, it is possible to achieve further reduction in the machining costs of the core presser 42 and the conductor bar 41 due to the parts such as the fixing peg 51 being unnecessary in addition to the same effects as those of the first modified example described above.

Third Modified Example of First Embodiment

Figure 5:
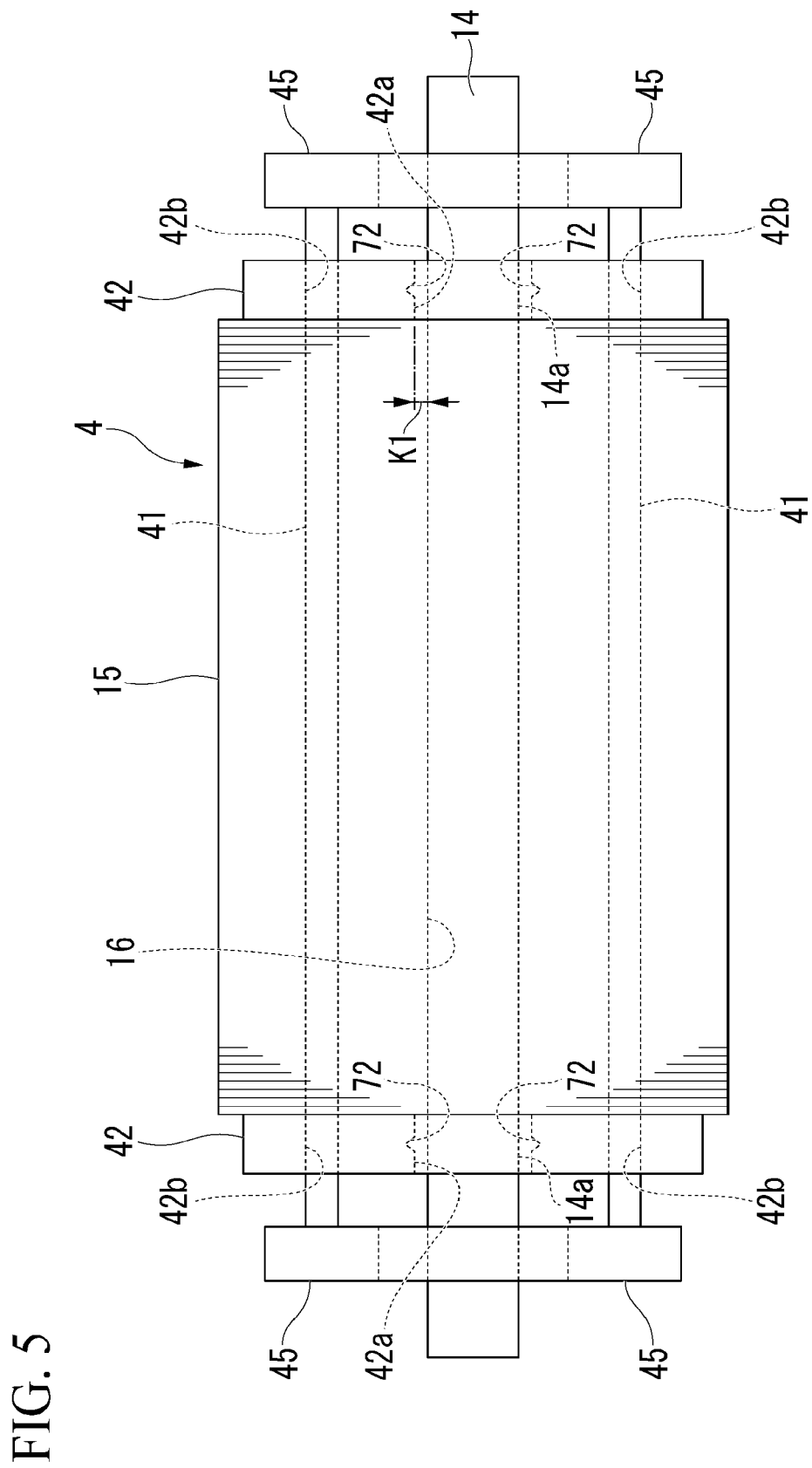
FIG. 5 is a side view showing a rotor of a third modified example in the first embodiment.

FIG. 5 is a side view showing the rotor 4 of a third modified example in the first embodiment and corresponds to FIG. 2 described above.

As shown in FIG. 5, the through hole 42*a* of the core presser 42 is formed in an annular shape to surround the shaft 14 and to have a predetermined gap K1 formed in the radial direction between an outer circumferential surface of the shaft 14 and the through hole 42*a*.

Also, a plurality of crimped parts (inner circumferential crimped parts, crimped marks) 72 are formed in a circumferential direction on the through hole 42*a* of the core presser 42 in the vicinity of the conductor insertion hole 42*b*. The crimped parts 72 are formed by crimping the through hole 42*a* of the core presser 42. When the crimped parts 72 are formed in the through hole 42*a* of the core presser 42, a radially inward side of the conductor insertion hole 42*b* has a slightly crushed shape. Thereby, the conductor bar 41 is crimped and fixed to the core presser 42.

Further, in the third modified example, since the shaft 14 is not press-fitted to the core presser 42, the core presser 42 is not fixed to the shaft 14. However, the rotor core 15 is in a form of being sandwiched by the core pressers 42 from both sides in the central axis O direction, and furthermore, the core pressers 42 and the conductor bars 41 are fixed to each other. Therefore, even with the rotor core 15 configured by laminating a plurality of electromagnetic steel sheets, the rotor core 15 is not disassembled. Also, when the core pressers 42 as in the third modified example are used, the rotor core 15 need only be fixed to the shaft 14 by press-fitting or the like.

Therefore, according to the third modified example, the same effects as those of the second modified example described above can be achieved.

Further, a case in which the crimped parts 71 are formed on the outer circumferential surface 42*c* of the core presser 42 has been described in the second modified example described above, and a case in which the crimped parts 72 are formed in the through hole 42*a* of the core presser 42 has been described in the third modified example described above. However, the two crimped parts 71 and 72 may be formed on the core presser 42. With such a configuration, a fixing force of the conductor bar 41 to the core presser 42 can be further enhanced.

Fourth Modified Example of First Embodiment

Figure 6A:
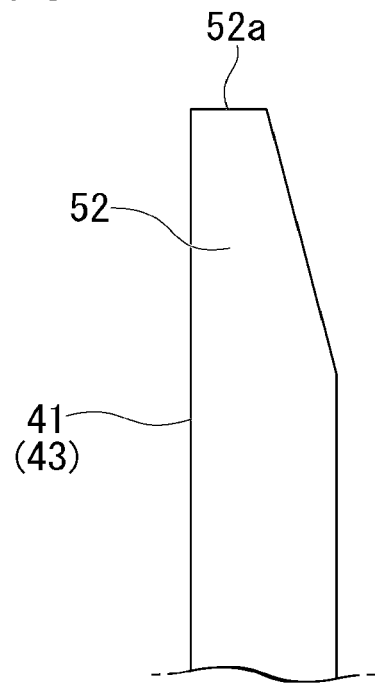
FIG. 6A is a schematic configuration view of a conductor bar of a fourth modified example in the first embodiment.
Figure 6B:
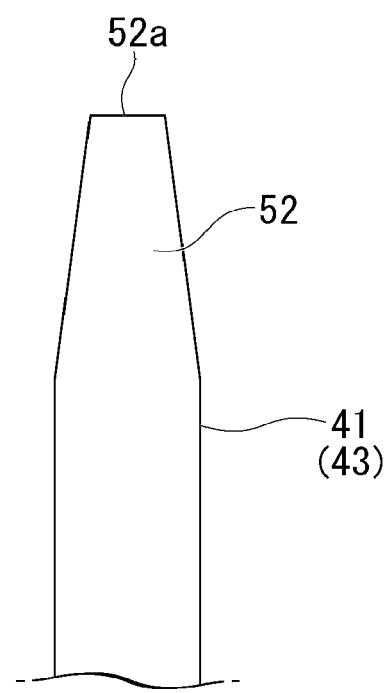
FIG. 6B is a schematic configuration view of a conductor bar of the fourth modified example of the first embodiment different from that in FIG. 6A.

FIG. 6A is a schematic configuration view of an end portion in the central axis O direction of the conductor bar 41 of the fourth modified example in the first embodiment. FIG. 6B is a schematic configuration view of the conductor bar 41 of the fourth modified example in the first embodiment that is different from FIG. 6A.

At the end portion of the conductor bar 41 in the central axis O direction, a tapered part 52 which gradually tapers toward the end portion is integrally molded. Only one side of the tapered part 52 may be inclined and tapered as shown in FIG. 6A, and two sides of the tapered part 52 facing each other may be inclined and tapered as shown in FIG. 6B.

Here, in a case in which the tapered part 52 is formed integrally with the conductor bar 41, the opening area of the conductor insertion hole 42*b* of the core presser 42 is set to be smaller than a cross-sectional area of a bar main body 43 which is a portion of the conductor bar 41 inserted through the hollow parts 23 and 24. Also, the opening area of the conductor insertion hole 42*b* is set to be larger than a cross-sectional area at a distal end 52*a* of the tapered part 52.

With such a configuration, when the conductor bar 41 is inserted into the conductor insertion hole 42*b* of the core presser 42, since the opening area of the conductor insertion hole 42*b* is larger than the cross-sectional area of the distal end 52*a* of the tapered part 52, the tapered part 52 can be smoothly inserted into the conductor insertion hole 42*b*. When the conductor bar 41 is continued to be inserted further into the conductor insertion hole 42*b*, the conductor bar 41 can be smoothly press-fitted into the conductor insertion hole 42*b*.

Therefore, according to the fourth modified example, an assembling operation of the rotor 4 can be facilitated.

Fifth Modified Example of First Embodiment

Figure 7:
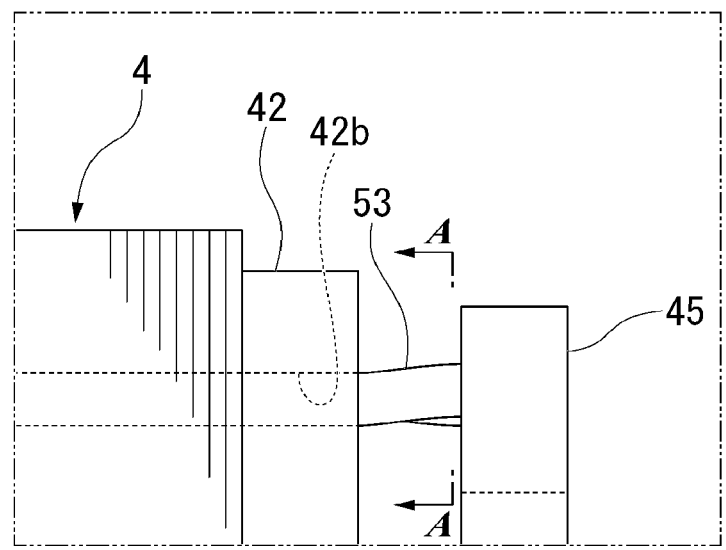
FIG. 7 is a partially enlarged side view showing a conductor bar of a fifth modified example in the first embodiment.
Figure 8:
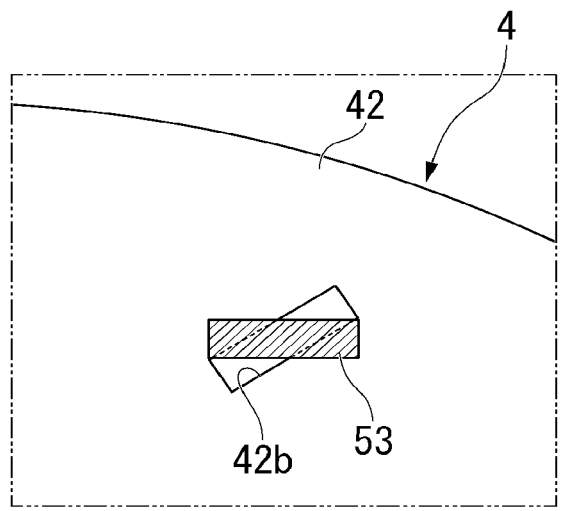
FIG. 8 is a cross-sectional view taken along line A-A of FIG. 7.

FIG. 7 is a partially enlarged side view of the conductor bar 41 of a fifth modified example in the first embodiment from the radial direction of the shaft 14. FIG. 8 is a cross-sectional view taken along line A-A of FIG. 7.

As shown in FIGS. 7 and 8, when the conductor bar 41 is fixed to the core presser 42, a twisted part 53 may be formed on the conductor bar 41 protruding in the central axis O direction from the core presser 42. The twisted part 53 is formed by twisting the conductor bar 41 around an axial direction. With such a configuration, a direction of a cross-sectional shape of the twisted part 53 with respect to a direction of the conductor insertion hole 42*b* is deviated. Therefore, since a direction in which the conductor bar 41 is pulled out from the core presser 42 is restricted, the conductor bar 41 can be fixed to the core presser 42.

Sixth Modified Example of First Embodiment

Figure 9:
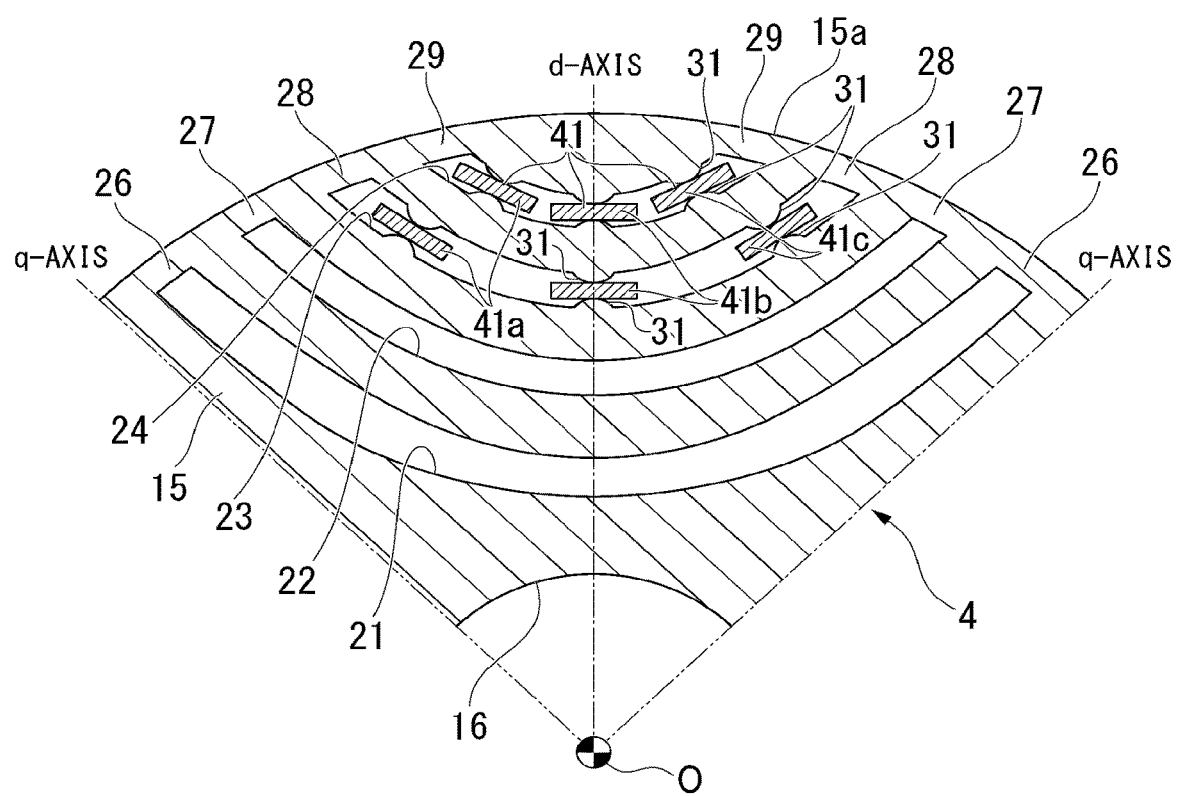
FIG. 9 is a cross-sectional view showing a configuration of a portion of a rotor core of a sixth modified example in the first embodiment.

FIG. 9 is a cross-sectional view perpendicular to the shaft 14 showing a configuration of a portion of the rotor core 15 of a sixth modified example in the first embodiment and corresponds to FIG. 1 described above.

As shown in FIG. 9, a protruding part 31 facing each of the hollow parts 23 and 24 may be formed at portions of the rotor core 15 at which the conductor bars 41 are disposed. Thus, each of the conductor bars 41 may be sandwiched by these protruding parts 31. With such a configuration, the conductor bars 41 can be more firmly fixed in each of the hollow parts 23 and 24.

Further, in the sixth modified example, a case in which the protruding part 31 is formed at each of the portions of the rotor core 15 at which the conductor bar 41 is disposed has been described. However, it is not limited thereto, and it is also possible to form the protruding part 31 only at a portion at which an arbitrary conductor bar 41 is disposed and to sandwich only the arbitrary conductor bar 41 by the protruding parts 31.

Seventh Modified Example of First Embodiment

Figure 10:
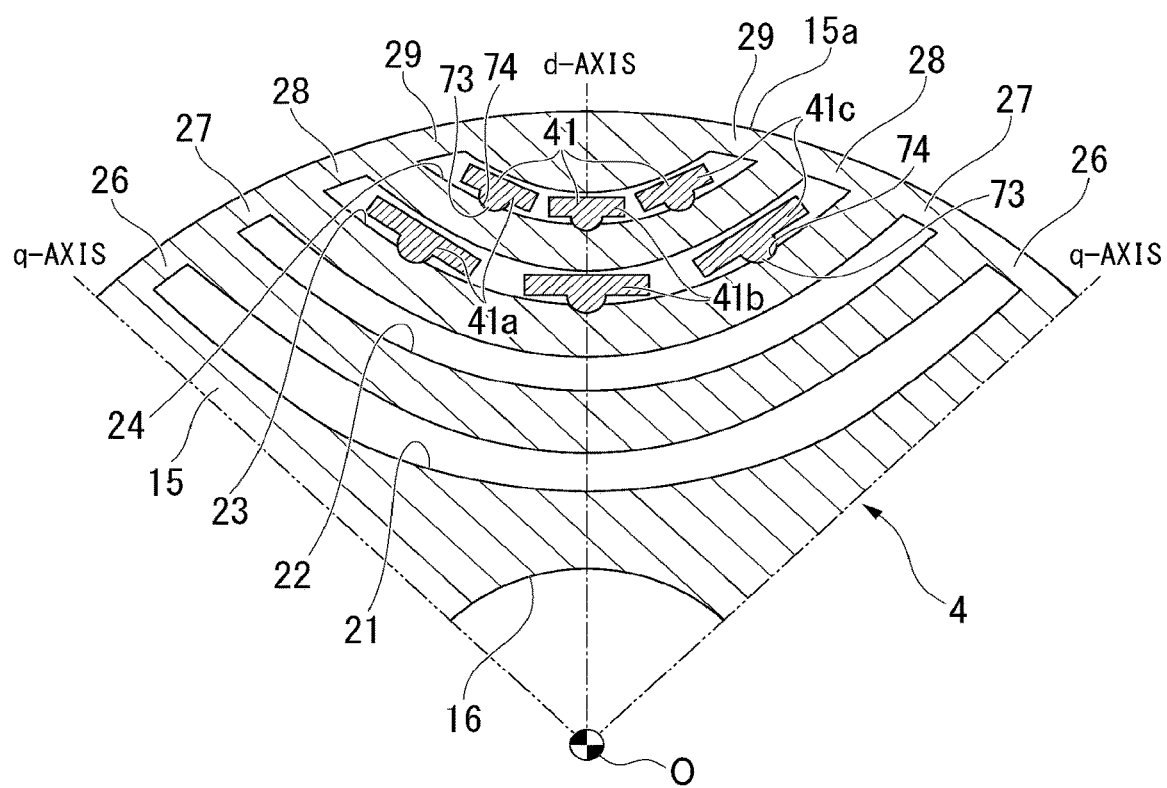
FIG. 10 is a cross-sectional view showing a configuration of a portion of a rotor core of a seventh modified example in the first embodiment.

FIG. 10 is a cross-sectional view perpendicular to the shaft 14 showing a configuration of a portion of the rotor core 15 of a seventh modified example in the first embodiment and corresponds to FIG. 1 described above.

As shown in FIG. 10, a ridge part 73 is formed on each conductor bar 41 of a portion positioned in each of the hollow parts 23 and 24 throughout in the central axis O direction. The ridge part 73 protrudes in a thickness direction of the conductor bar 41 on one surface (a surface on the shaft 14 side in FIG. 10) of both surfaces in the thickness direction of the conductor bar 41. In other words, the ridge part 73 is formed to protrude to face the hollow parts 23 and 24.

On the other hand, a recess 74 for receiving the ridge part 73 is formed on the rotor core 15 throughout in the central axis O direction at a position corresponding to each ridge part 73. That is, the ridge parts 73 correspondingly fit into the respective recesses 74.

Therefore, according to the seventh modified example, the conductor bar 41 can be more firmly fixed in each of the hollow parts 23 and 24 and a position of the conductor bar 41 can be precisely determined in each of the hollow parts 23 and 24.

Further, in the seventh modified example, a case in which the ridge part 73 protrudes from one surface (the surface on the shaft 14 side in FIG. 10) of both surfaces of the conductor bar 41 in the thickness direction has been described. However, it is not limited thereto, and the ridge part 73 may be formed on both surfaces of the conductor bar 41 in the thickness direction. In this case, the recess 74 for receiving each ridge part 73 only need be formed in the rotor core 15.

Also, in the seventh modified example, a case in which the ridge part 73 formed on each conductor bar 41 is formed on a portion positioned in each of the hollow parts 23 and 24 throughout in the central axis O direction has been described. Also, a case in which the recess 74 formed on the rotor core 15 is formed throughout in the central axis O direction to correspond to a shape of the ridge part 73 has been described. However, it is not limited thereto, and a length of the ridge part 73 may be set to be smaller than a length of the rotor core 15 in the central axis O direction. Also, a plurality of ridge parts 73 having this small length may be aligned in the central axis O direction. In this case, a shape of the recess 74 formed on the rotor core 15 need only be formed to correspond to a shape of the ridge part 73.

Further, it is not limited to the ridge part 73 formed on each of the conductor bars 41 and the recess 74 formed on the rotor core 15, and the ridge part 73 and the recess 74 may be inversely formed. That is, the ridge part 73 may be formed on the rotor core 15 to protrude toward the conductor bar 41, and the recess 74 may be formed on the conductor bar 41.

Also, in the first embodiment described above, a case in which three conductor bars 41 (41*a*, 41*b*, and 41*c*) are inserted into each of the third hollow part 23 and the fourth hollow part 24 among the hollow parts 21 to 24 has been described. However, it is not limited thereto, and the conductor bars 41 may be inserted into a hollow part arbitrarily selected from the hollow parts 21 to 24. However, the conductor bars 41 are disposed to be spaced apart from the bridges corresponding to both sides in a longitudinal direction of the hollow part arbitrarily selected at least from the hollow parts 21 to 24 at a predetermined distance. Thereby, each of the conductor bars 41 appropriately functions as a secondary coil and generates a starting torque for rotating the rotor 4 between the conductor bars 41 and the stator 3.

Second Embodiment

Next, a second embodiment will be described with reference to FIGS. 11 and 12.

Figure 11:
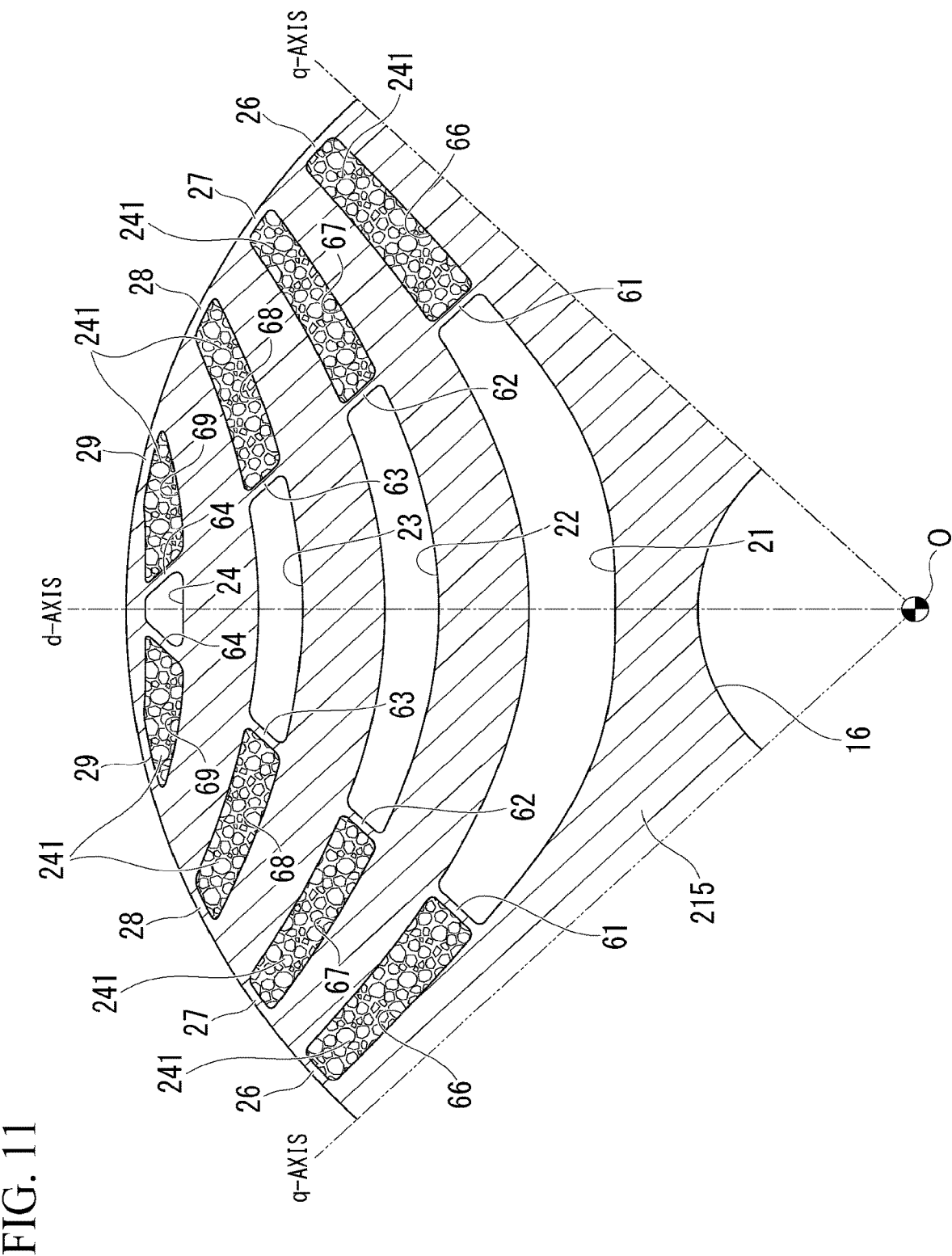
FIG. 11 is a cross-sectional view showing a configuration of a portion of a rotor core of a second embodiment.

FIG. 11 is a cross-sectional view perpendicular to the shaft 14 showing a configuration of a portion of a rotor core 215 in the second embodiment.

As shown in FIG. 11, in the rotor core 215 of the second embodiment, conductor bars 41 are not inserted into hollow parts 23 and 24, and conductors 241 in place of the conductor bars 41 are cast therein. This point is different from the first embodiment described above.

In each of the hollow parts 21 to 24 of the rotor core 215, partition bridges (61 to 64) which are respectively spaced apart from bridges (26 to 29) corresponding to both sides in a longitudinal direction of the hollow parts at a predetermined distance are formed. Due to the partition bridges 61 to 64, the hollow parts 21 to 24 are partitioned. Then, casting spaces 66 to 69 are respectively formed on both sides in the longitudinal direction of the hollow parts 21 to 24. The conductors 241 are cast into the casting spaces 66 to 69. As in the first embodiment described above, the conductor 241 is formed of a nonmagnetic material having conductivity such as, for example, an aluminum alloy or a copper alloy.

Next, a method of forming the conductor 241 will be described with reference to FIG. 12.

Figure 12:
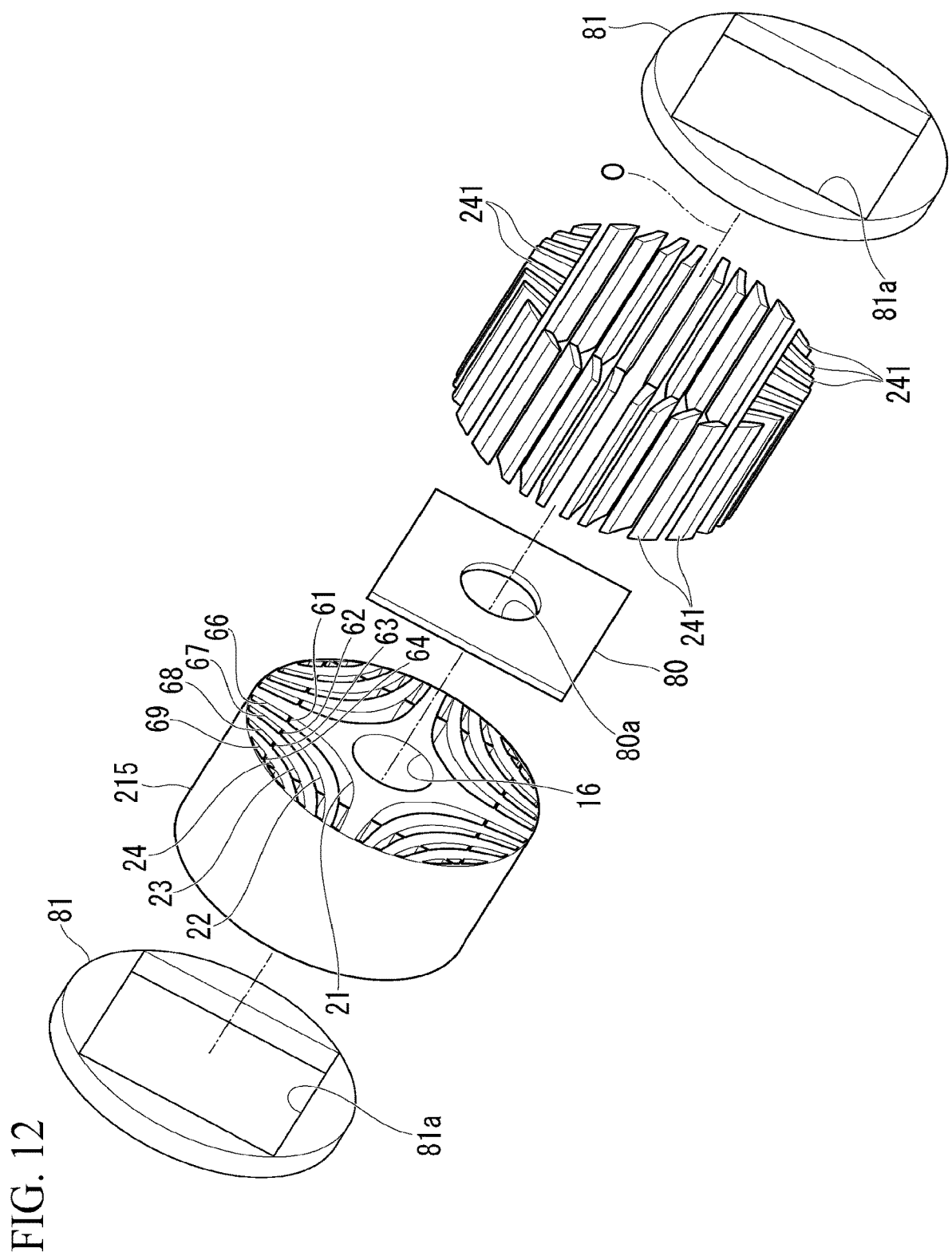
FIG. 12 is an exploded perspective view of a rotor core and a conductor of the second embodiment.

FIG. 12 is an exploded perspective view of the rotor core 215 and the conductor 241.

As shown in FIG. 12, when the conductor 241 is cast into the casting spaces 66 to 69 respectively formed in the hollow parts 21 to 24, a mask plate 80 is disposed at an end portion in the central axis O direction of the rotor core 215.

The mask plate 80 is a plate member formed in substantially a quadrangular shape in a plan view to close radially inward (on a through hole 16 side) of the partition bridges 61 to 64 of the rotor core 215. That is, the mask plate 80 is formed in substantially a quadrangular shape so that each side of the mask plate 80 extends along the partition bridges 61 to 64. Thereby, in the hollow parts 21 to 24, portions other than the casting spaces 66 to 69 are closed by the mask plate 80.

Also, in the mask plate 80, a through hole 80a is formed at a position corresponding to the through hole 16 of the rotor core 215. An inner diameter of the through hole 80a is set to be substantially the same as an inner diameter of the through hole 16 of the rotor core 215.

Next, in a state in which the mask plate 80 is disposed on the rotor core 215, a melted conductor 241 is poured into the casting spaces 66 to 69 of the rotor core 215. At this time, since the portions other than the casting spaces 66 to 69 are closed by the mask plate 80, the conductor 241 is prevented from leaking into the hollow parts 21 to 24 other than the casting spaces 66 to 69.

Next, substantially annular short-circuit rings 81 are formed at both ends of the rotor core 215 in the central axis O direction. Each of the short-circuit rings 81 is formed by molding or the like using the same material as that of the conductor 241. The short-circuit ring 81 is formed at a position corresponding to the conductor 241, and a quadrangular opening 81a having the same shape as the mask plate 80 is formed radially inward. The short-circuit ring 81 is connected to an end portion in the central axis O direction of each conductor 241. Thereby, each of the conductors 241 is short-circuited through the short-circuit ring 81.

Then, the mask plate 80 is removed after the conductor 241 and the short-circuit ring 81 are cooled and cured. As a result, formation of the conductor 241 is completed.

Therefore, according to the second embodiment described above, when the partition bridges 61 to 64 are respectively provided in the hollow parts 21 to 24, the whole of the hollow parts 21 to 24 can be prevented from being filled with the conductor 241 even when the conductor 241 is cast into the hollow parts 21 to 24. Therefore, the material costs of the conductor 241 can be reduced.

Modified Example of Second Embodiment

Further, in the second embodiment described above, a case in which the short-circuit ring 81 is formed by molding or the like has been described. However, it is not limited thereto, and the short-circuit ring 81 may be formed by subjecting a nonmagnetic plate having conductivity such as, for example, an aluminum alloy or a copper alloy to a press processing. Then, the short-circuit ring 81 may be configured to be joined to the conductor 241. With such a configuration, since a mold or the like is unnecessary when the short-circuit ring 81 is formed, equipment cost can be reduced.

Further, in the second embodiment described above, a case in which a partition range of each of the hollow parts 21 to 24 by the respective partition bridges 61 to 64 form substantially a rectangular shape as a whole when viewed from the central axis O direction has been described. Further, in the second embodiment described above, a case in which the mask plate 80 formed to correspond to the partition bridges 61 to 64 is formed in substantially a rectangular shape when viewed from the central axis O direction has been described. However, it is not limited thereto, and the partition range of each of the hollow parts 21 to 24 by the respective partition bridges 61 to 64 and the shape of the mask plate 80 can be arbitrarily set.

Further, in the second embodiment described above, a case in which the conductor 241 is cast into the casting spaces 66 to 69 formed by the partition bridges 61 to 64 has been described. However, it is not limited thereto, and the conductor bars 41 in the first embodiment described above may be disposed in the casting spaces 66 to 69. Also with such a configuration, the conductor bars 41 can be disposed and fixed to a desired position in each of the hollow parts 21 to 24.

Further, the partition bridges 61 to 64 may not be provided in each of the hollow parts 21 to 24, and the partition bridges 61 to 64 may be formed at arbitrary hollow parts 21 to 24 and the conductor 241 may be formed in the casting spaces 66 to 69 formed thereby.

Third Embodiment

Next, a third embodiment will be described with reference to FIGS. 13 and 14.

Figure 13:
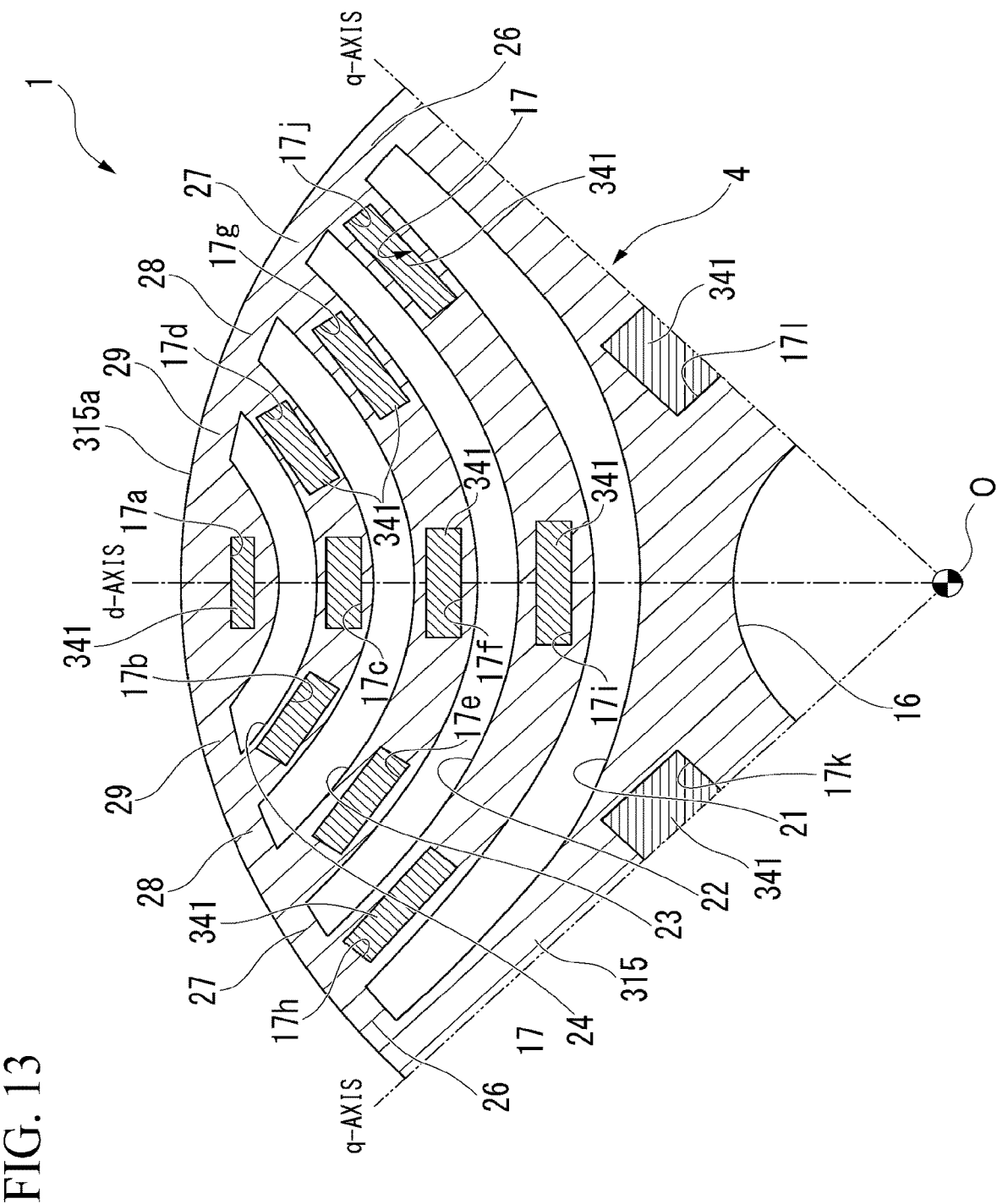
FIG. 13 is a cross-sectional view showing a configuration of a portion of a rotor core of a third embodiment.

FIG. 13 is a cross-sectional view perpendicular to the shaft 14 showing a configuration of a portion of a rotor core 315 in the third embodiment. FIG. 14 is a side view of a rotor 304 of the third embodiment from a radial direction of a shaft 14.

Figure 14:
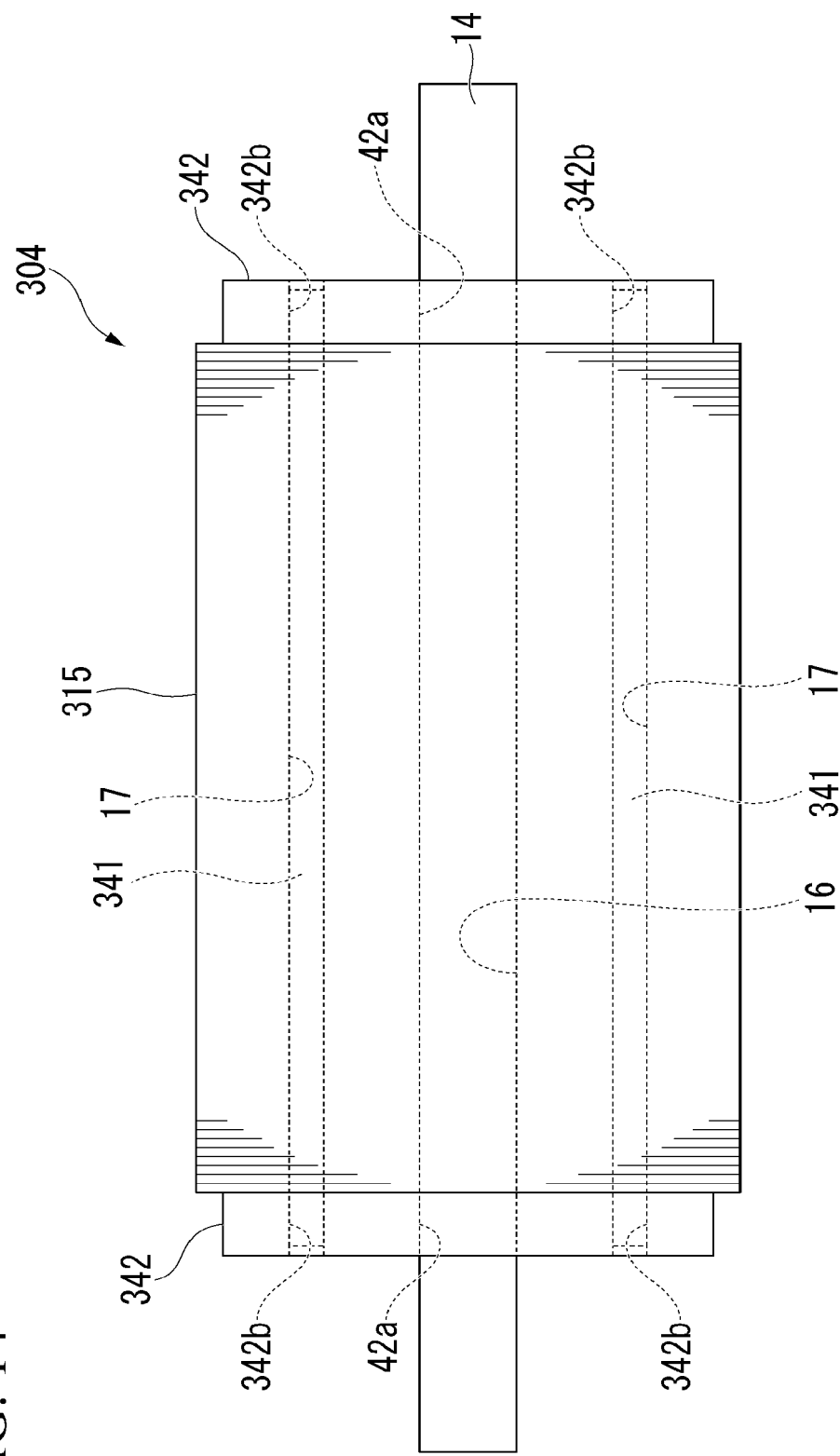
FIG. 14 is a side view showing a rotor of the third embodiment.

As shown in FIGS. 13 and 14, in the rotor core 315 of the third embodiment, the conductor bars 41 are not inserted into each of the hollow parts 21 to 24, and instead of this, through holes 17 (17a to 17l) are formed at positions of the rotor core 315 other than the hollow parts 21 to 24. Then, conductor bars 341 are provided in the through holes 17. This point is different from the first embodiment described above.

More specifically, the rotor core 315 includes the through hole 17a formed closer to an outer circumferential surface 315a of the rotor core 315 than the fourth hollow part on a d-axis. Also, three of the through holes 17b to 17j are formed between each of the hollow parts 21 to 24 in the rotor core 315. Further, two through holes 17k and 17l are respectively formed on q axis sides between the first hollow part 21 and a through hole 16 through which the shaft 14 is inserted.

Each of the through holes 17a to 17l passes through the rotor core 315 in a central axis O direction, and a cross-sectional shape thereof perpendicular to the central axis O is substantially rectangular. Also, among the through holes 17a to 17l, the through holes 17b to 17j formed between the hollow parts 21 to 24 are disposed at regular intervals in a longitudinal direction of each of the hollow parts 21 to 24. That is, each of the through holes 17c, 17f, and 17i are disposed on the d-axis of the rotor core 315. Further, each of the through holes 17b, 17d, 17e, 17g, 17h, and 17j is disposed close to the outer circumferential surface 315a of the rotor core 315.

The conductor bars 341 are respectively inserted into the through holes 17a to 17l formed as above. Since each of the conductor bars 341 is disposed on a path through which magnetic flux of the rotor core 315 passes, the conductor bar 341 is formed of a magnetic material having conductivity that does not interrupt a flow of the magnetic flux. For example, the conductor bar 341 is preferably formed of a high permeability material such as iron or permendur. Also, the conductor bar 341 is formed in substantially a rectangular shape to have substantially the same cross-sectional shape as the cross-sectional shape of each of the through holes 17a to 17l. The conductor bar 341 is disposed without a clearance with respect to each of the through holes 17a to 17l. Further, both ends in the central axis O direction of the conductor bar 341 are formed to respectively protrude from both ends in the central axis O direction of the rotor core 315.

Incidentally, each of the through holes 17a to 17l in a state in which the conductor bar 341 is not inserted functions in the same manner as each of the hollow parts 21 to 24. However, when the conductor bar 341 is inserted into each of the through holes 17a to 17l, the conductor bar 341 and the rotor core 315 are integrated, and the conductor bar 341 does not serve as a magnetic barrier.

Both ends of each conductor bar 341 are short-circuited by being respectively joined to core pressers 342 provided at both ends of the rotor core 315 in the central axis O direction. As in the conductor bar 341, the core presser 342 also is formed of a magnetic material having conductivity.

Conductor insertion holes 342b are formed in the core pressers 342 at positions corresponding to the respective conductor bars 341. The conductor bars 341 are press-fitted and fixed to the corresponding conductor insertion holes 342b. Further, when the conductor bar 341 is fixed to the core presser 342, the conductor bar 341 may be fixed to the conductor insertion hole 342b by shrinkage-fitting instead of press-fitting. In addition, as in the embodiments and modified examples described above, the conductor bar 341 may be fixed to the core presser 342 by using a fixing peg 51 or twisting both end portions of each conductor bar 341.

With such a configuration, each of the conductor bars 341 functions as a secondary coil together with the core presser 342 and a starting torque for rotating the rotor 304 is generated between the stator 304 (not shown in FIGS. 13 and 14) and the conductor bar 341.

Therefore, according to the third embodiment described above, since an inverter is not necessary for starting the rotor 304 as in the first embodiment, the commodity costs of the rotary electric machine 1 can be reduced and the driving efficiency can be improved.

Also, in an asynchronous state until the rotor 304 in a stopped state rotates in synchronization with rotational movement of the magnetic flux on the stator 3 side, an induced current is generated in the conductor bars 341 provided in the rotor core 315. This induced current magnetically saturates the surroundings of the conductor bars 341. Due to the magnetic saturation, magnetoresistance of a q-axis magnetic path increases and a salient pole ratio decreases.

On the other hand, at the time of starting the rotor 304 (when a rotation speed of the rotor 304 is slow relative to a rotational movement speed of magnetic flux on the stator 3 side), a reverse-phase current caused by saliency of the rotor 304 flows. Then, at a rotation speed at which the rotation speed of the rotor 304 is equal to or more than ½ of the synchronous speed, a torque is generated in a direction that interrupts the starting torque. In contrast, when the conductor bars 341 are provided in the rotor core 315, the salient pole ratio at the time of starting decreases.

Therefore, the reverse-phase current is alleviated, and the decrease of the starting torque can be suppressed. Further, in a synchronous operation, since almost no current is generated in the conductor bars 341, a salient pole ratio does not decrease, and torque characteristics, power factor, or the like does not decrease.

Further, in the third embodiment described above, although the conductor bars 341 can be provided at any position other than the hollow parts 21 to 24 of the rotor core 315, the conductor bars 341 are preferably provided at positions close to the outer circumferential surface 315a of the rotor core 315. However, it is desirable to dispose the conductor bars 341 at a suitable distance at which an undesirable harmonic current does not flow to the conductor bar 341 at a predetermined distance on an inward side of the outer circumferential surface 315a of the rotor core 315.

In the above-described embodiments, a case in which four layers of the hollow parts 21 to 24 are formed in each quarter-circumference circumferential angular region (for each pole) in the rotor cores 15, 215, and 315 has been described. However, it is not limited thereto, and a plurality of hollow parts of four or more layers may be formed. Even when four or more layers of hollow parts are formed, the conductor bar 41 may be inserted into an arbitrary hollow part or the conductor 241 may be formed therein.

Further, in the above-described embodiments, a case in which each of the hollow parts 21 to 24 is formed to be curved so that a center thereof in the circumferential direction is positioned furthest inward in the radial direction (to have a convex shape toward the radially inward side) has been described. However, it is not limited thereto, and each of the hollow parts 21 to 24 need only be formed in a convex shape toward the radially inward side. That is, each of the hollow parts 21 to 24 may not be formed to be curved.

Also, in the above-described embodiments, a case in which the rotor cores 15, 215, and 315 are configured to have four poles has been described. However, it is not limited thereto, and the rotor cores 15, 215, and 315 may be configured to have four or more poles.

According to at least one of the embodiments described above, since an inverter is not necessary for starting the rotary electric machine 1, the commodity costs of the rotary electric machine 1 can be reduced. Further, the rotary electric machine 1 can also be started using an inverter as a matter of course.

Further, the conductor bar 41 and the conductor 241 can be fixed only to a portion of the hollow parts 21 to 24 of the rotor core 15. Therefore, the manufacturing costs of the rotary electric machine 1 can also be reduced. Also, a starting torque for rotating the rotor 4 can be obtained efficiently while reducing the size of the conductor bar 41 and the conductor 241 to a minimum, and the driving efficiency of the rotary electric machine 1 can be improved.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A synchronous reluctance type rotary electric machine comprising:
    a shaft rotating around a rotation axis;
    a rotor core fixed to the shaft and including multi-layered hollow parts having a convex shape toward a radially inward side formed for each pole in cross section;
    rotor core pressers holding the rotor core by pressing the rotor core from both sides in a rotation axis direction;
    a plurality of conductor bars disposed in the hollow parts to extend along the rotation axis and having both ends protruding through the rotor core pressers; and
    short-circuit rings provided at both ends of each of the plurality of conductor bars and connecting the plurality of conductor bars together, wherein
    the conductor bars are fixed to the rotor core pressers.

2. The synchronous reluctance type rotary electric machine according to claim 1, wherein
    the rotor core pressers include a plurality of insertion holes through which the plurality of conductor bars are inserted, and
    a fixing peg for fixing each of the rotor core pressers and each of the conductor bars is provided between the plurality of insertion holes and the plurality of conductor bars.

3. The synchronous reluctance type rotary electric machine according to claim 1, wherein
    the rotor core pressers include the plurality of insertion holes through which the plurality of conductor bars are inserted, and
    a twisted part formed by twisting a conductor bar of the plurality of conductor bars is formed at a position on the conductor bar corresponding to a rotor core presser of the rotor core pressers.

4. The synchronous reluctance type rotary electric machine according to claim 1, wherein
    the rotor core pressers include a plurality of insertion holes through which the plurality of conductor bars are inserted, and
    an outer circumferential crimped part which fixes a conductor bar of the plurality of conductor bars to a rotor core presser of the rotor core pressers by crimping an outer circumferential portion of the rotor core presser is formed on the outer circumferential portion of the rotor core presser.

5. The synchronous reluctance type rotary electric machine according to claim 1, wherein
    a rotor core presser of the rotor core pressers is formed in an annular shape to surround a periphery of the shaft and such that there is a predetermined gap in a radial direction between an outer circumferential surface of the shaft and the rotor core presser and includes a plurality of insertion holes through which the plurality of conductor bars are inserted, and
    an inner circumferential crimped part which fixes a conductor bar of the plurality of conductor bars to the rotor core presser by crimping an inner circumferential portion of the rotor core presser is formed on the inner circumferential portion of the rotor core presser.

6. The synchronous reluctance type rotary electric machine according to claim 1, wherein
    through holes are formed at positions on a rotor core presser of the rotor core pressers corresponding to the conductor bars,
    each of the conductor bars includes a bar main body inserted into a hollow part of the multi-layered hollow parts and a tapered part formed in a tapered shape and provided at both ends in the rotation axis direction of the bar main body, and
    an opening area of each of the through holes is set to be smaller than a cross-sectional area of the bar main body perpendicular to the rotation axis direction and to be larger than a cross-sectional area of the tapered part perpendicular to the rotation axis direction at a distal end portion of the tapered part.

7. The synchronous reluctance type rotary electric machine according to claim 1, wherein a protruding part protruding to face a hollow part of the multi-layered hollow parts and positioning a conductor bar of the plurality of conductor bars is formed at a position on the rotor core corresponding to the conductor bar.

8. The synchronous reluctance type rotary electric machine according to claim 1, wherein
    on one side of a portion of a conductor bar of the plurality of conductor bars positioned in a hollow part of the multi-layered hollow parts and a portion of the rotor core corresponding to the conductor bar, a ridge part protruding toward the other side is formed at least at a portion in an axial direction, and
    a recess for receiving the ridge part formed on the one side is formed on the other side of either the portion of the conductor bar positioned in the hollow part or the
    portion of the rotor core corresponding to the conductor bar.

* * * * *